(12) United States Patent
Ito et al.

(10) Patent No.: US 6,499,788 B2
(45) Date of Patent: Dec. 31, 2002

(54) AUTOMOTIVE DISPLAY DEVICE

(75) Inventors: Tomokazu Ito, Nagoya (JP); Kenji Okamoto, Nagoya (JP); Katsuhiro Katagiri, Nishikasugai-gun (JP); Minoru Shibata, Nishikasugai-gun (JP)

(73) Assignees: Autonetworks Technologies, Ltd., Nagoya (JP); Sumitomo Wiring Systems, Ltd., Mie (JP); Sumitomo Electric Industries, Ltd., Osaka (JP); Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/840,972

(22) Filed: Apr. 25, 2001

(65) Prior Publication Data

US 2001/0042990 A1 Nov. 22, 2001

(30) Foreign Application Priority Data

May 2, 2000 (JP) ........................................ 2000-133612

(51) Int. Cl.[7] .............................................. D62D 25/14
(52) U.S. Cl. ...................................... 296/70; 296/37.12
(58) Field of Search ...................... 296/70, 37.1, 37.5, 296/37.7, 37.8, 37.12; 361/681, 682

(56) References Cited

U.S. PATENT DOCUMENTS

| 4,312,577 | A | * | 1/1982 | Fitzgerald | 340/286.14 |
|---|---|---|---|---|---|
| 4,706,810 | A | * | 11/1987 | Petrilli | 296/70 X |
| 6,086,129 | A | * | 7/2000 | Gray | 296/37.8 |
| 6,152,514 | A | * | 11/2000 | McLellen | 296/37.8 |
| 6,158,795 | A | * | 12/2000 | Gray et al. | 296/37.8 X |
| 6,241,300 | B1 | * | 6/2001 | Suzuki | 296/37.12 |
| 6,295,883 | B1 | * | 10/2001 | Tuskada et al. | 296/37.12 X |

FOREIGN PATENT DOCUMENTS

DE         4213129 A1 * 10/1993 ................... 296/70

* cited by examiner

Primary Examiner—D. Glenn Dayoan
Assistant Examiner—Jason Morrow
(74) Attorney, Agent, or Firm—Oliff & Berridge, PLC

(57) ABSTRACT

An automotive display unit includes a display unit 13 installed in an accommodating portion 5 provided in a dashboard portion, a closing member 15 for closing and/or opening an opening in the accommodating portion 5, a driving mechanism 17 provided with a motor 31 for driving the closing member 15, and a control unit, wherein the motor 31 is a pulse motor with an encoder, whereby while referring to a pulse output from the pulse motor 31, the control unit controls the driving of the motor 31 so as to adjust an opening width of the closing member 15 based on an opening or closing command inputted thereinto.

6 Claims, 13 Drawing Sheets

AUTOMOTIVE DISPLAY DEVICE

BACKGROUND OF THE INVENTION

1. Field of the Invention

The present invention relates to an automotive display device installed in a dashboard portion of an automotive vehicle.

2. Description of the Related Art

As a conventional automotive display device related to the aforesaid type of automotive display device there exists an automotive display device comprising a pop-up type display unit which is supported so as emerge from and submerge into the interior of the dashboard portion by means of a predetermined movable mechanism, and in such a display device the display unit is often adapted to pop up from the interior of the dashboard portion only when it is in use in consideration of design or protection against dust.

In addition, in this conventional automotive display device, the position of the display unit is alternatively changed over only between a popped-up state in which the front of a screen of the display unit has completely popped up on the dashboard and an accommodated state in which the display unit is accommodated in the dashboard, and therefore there has been conceived no construction in which the pop-up height of the display unit is changed in a stepped fashion. Consequently, the pop-up height of the display unit is predetermined according to the size (in particular, vertical size) of a display unit to be used and therefore it is fixed. Due to this, in the conventional pip-up type display device, the construction of a supporting unit for supporting a display unit so as to pop up is specific to the size of a display unit to be used.

With the conventional automotive display device described above, since the display unit is driven and displaced so as to emerge and/or submerge, in a case where touch switches are provided on the display unit, there may be caused a problem that an operation load which is applied to the display unit through the operation of the touch switch acts on the movable mechanism of the display unit as a load to thereby affect the operation of the movable mechanism.

In addition, with the conventional automotive display device, since the display unit is pulled downwardly so as to be accommodated in the interior of the dashboard portion, a space is required in the interior of the dashboard for accommodating the display unit therein, and this causes a problem that the installation of the display device in the dashboard portion cannot be realized unless there is much space secured in the interior of the dashboard portion of the vehicle.

Furthermore, with the conventional automotive display device, in a case where display units of different sizes are used, the constructions of supporting units for supporting the display units have to be replaced, this causing a problem that an increase in the number of components is called for.

In a case where a large-sized display unit is used which is large enough to display on its screen information on car navigation or the like, it is often the case with such a display unit that a single display unit is used to display not only information on the car navigation but also information on the operation of electric equipment such as an air conditioner and time. Since such a large display area is not usually required to display the information on the operation of the electric equipment and time, there is a demand that only a part of the display area on the screen of the display unit may be used to display such information.

In this case, only an upper portion of the display area of the screen of the display unit may be allowed to pop up on the dashboard for displaying the required information. However, with the conventional automotive display device, since the whole of the screen of the display unit is designed to pop up on an upper surface of the dashboard when the display unit is put in the popped-up state, an unnecessary portion of the screen of the display unit also pops up on the dashboard to thereby be viewed by the driver, this causing a problem that the driver is forced to be burdened visually.

SUMMARY OF THE INVENTION

The invention has been made in view of the aforesaid problems, and therefore a first object of the invention is to provide an automotive display device in which a display unit can be accommodated when not in use without making it movable.

A second object of the invention is to provide an automotive display device which can also be installed on an automotive vehicle in which there is not much space in the interior of a dashboard portion thereof.

A third object of the invention is to provide an automotive display device in which the opening width of an accommodating portion in which a display unit is installed can be set according to the size of the display unit or an area on the screen which is in use.

With a view to attaining the objects above, according to a first aspect of the invention, preferably, there is provided an automotive display device installed in a dashboard portion of an automotive vehicle, comprising; a display unit installed in an accommodating portion provided in the dashboard portion, and a closing member provided on the dashboard portion for closing and/or opening an opening in the accommodating portion.

According to a second aspect of the invention, preferably, there is provided an automotive display device as set forth in the first aspect of the invention, wherein the closing member is supported on the dashboard portion rotatably around a transverse shaft in such a manner as to close and/or open the opening in vertical directions, and wherein the automotive display device further comprises; a driving mechanism for driving the closing member to rotate based on the power of a motor to thereby open and/or close the closing member, and a control means for controlling the driving of the driving mechanism in response to an external input to thereby close and/or open the closing member and adjusting an opening width of the opening in a state in which the opening is left open.

According to a third aspect of the invention, preferably there is provided an automotive display device as set forth in the second aspect of the invention, wherein the motor of the driving mechanism is a servo motor with an encoder, and wherein the control means adjusts the opening width of the opening to a predetermined value based on a pulse output outputted from the motor as the motor revolves.

According to a fourth aspect of the invention, preferably there is provided an automotive display device as set forth in the second aspect of the invention, wherein the display unit has a function to vary a display area on a screen where display actually takes place, and wherein the control means adjusts the opening width of the opening to a vertical width of the display area of the screen of the display unit in the state in which the opening is left open.

According to a fifth aspect of the invention, preferably, there is provided an automotive display device as set forth in the second aspect of the invention, wherein the display unit comprises; a liquid crystal display panel, and a light source unit having a plurality of backlights adapted to be switched on and/or off independently of each other and provided at positions on a back of said liquid crystal display panel which correspond, respectively, to a plurality of sub-areas obtained by vertically dividing the screen of the liquid crystal display panel into a plurality of areas, and wherein the control means adjust the opening width of the opening in such a manner as to expose to the outside the respective sub-areas of the screen of the display unit in a stepped fashion in the state in which the opening is left open.

An automotive display device as set forth in Claim 2, wherein the driving mechanism comprises; a gear provided rotatably around a predetermined stationary transverse shaft located at a position of the closing member which is away from the rotating shaft of the closing member, the motor for driving the gear to rotate via a gear mechanism, a first link member adapted to rotate around said stationary transverse shaft together with the gear a second link member having first and second arm portions extending from a bend portion in two directions in such a manner as to form an L-shape when viewed from a side and pivotally connected at a distal end portion of said first arm portion thereof to a free end of said first link member, a third link member pivotally connected at one end thereof to the portion of the second link member and at the other end to the position of the closing member which is away from the rotating shaft of the closing member, a first engagement portion provided at the bend portion of the second link member or the one end of the third link member;

a second engagement portion provided at a distal end portion of the second arm portion of the second link member, a third engagement portion provided at either the one end or the other end of the third link member such that a distance from the first engagement portion thereto becomes longer than a distance between the first and second engagement portions, and a biasing means adapted to be brought into engagement with the first, second and third engagement portions so as to bias the first, second and third engagement portions such that the first, second and third engagement portions are arranged linearly, wherein the power of the motor is transmitted to the closing member via the gear mechanism, said gear, said first link member, the second link member and said third link member, whereby the closing member is closed and/or opened.

DETAILED DESCRIPTION OF THE PRFERRED EMBODIMENTS

Now, a description will be given in more detail of preferred embodiments of the invention with reference to the accompanying drawings.

Figure 1:
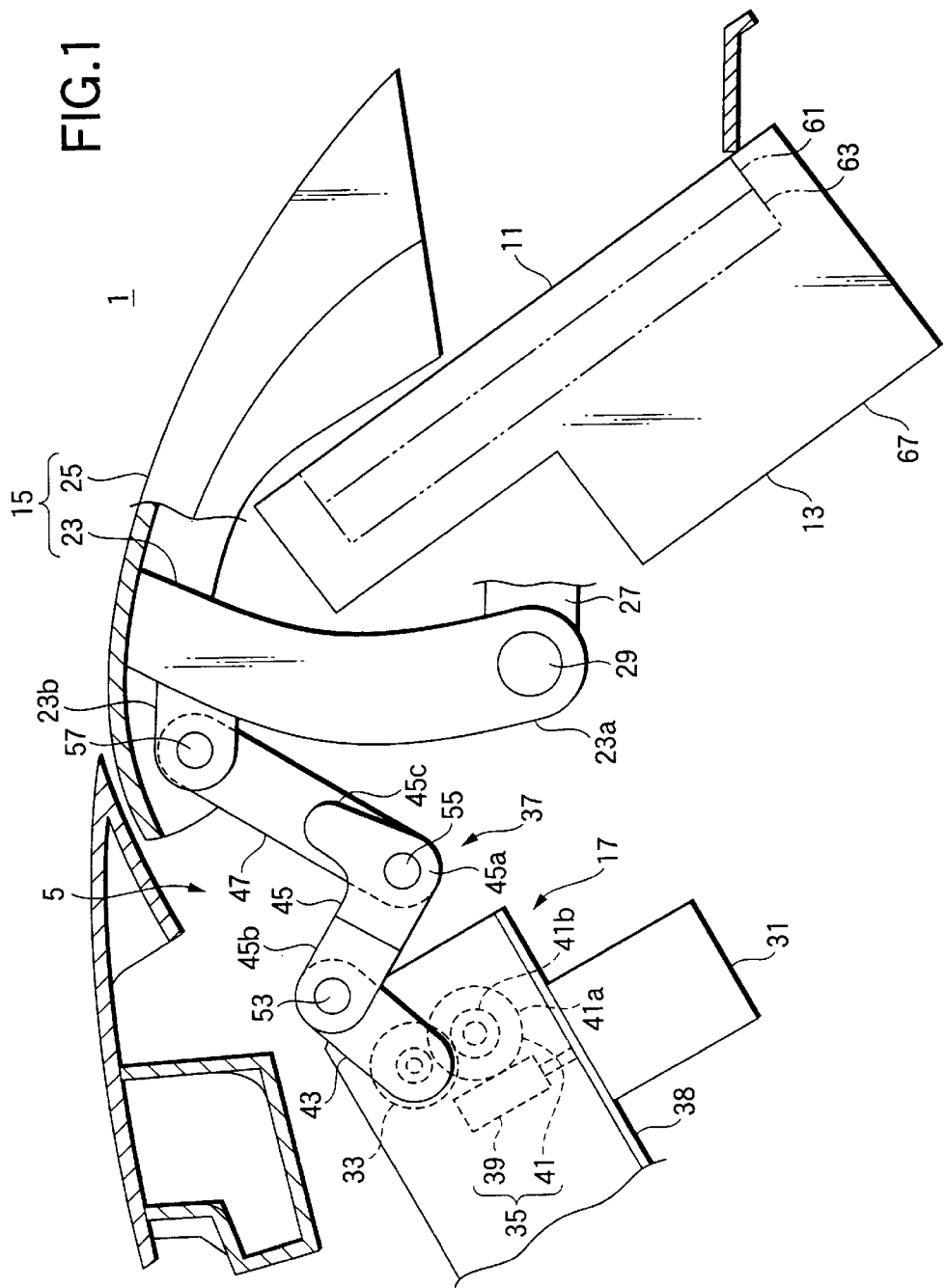
FIG. 1 is a partially cut-away side view of a main part of an automotive display device according to one embodiment of the invention.
Figure 2:
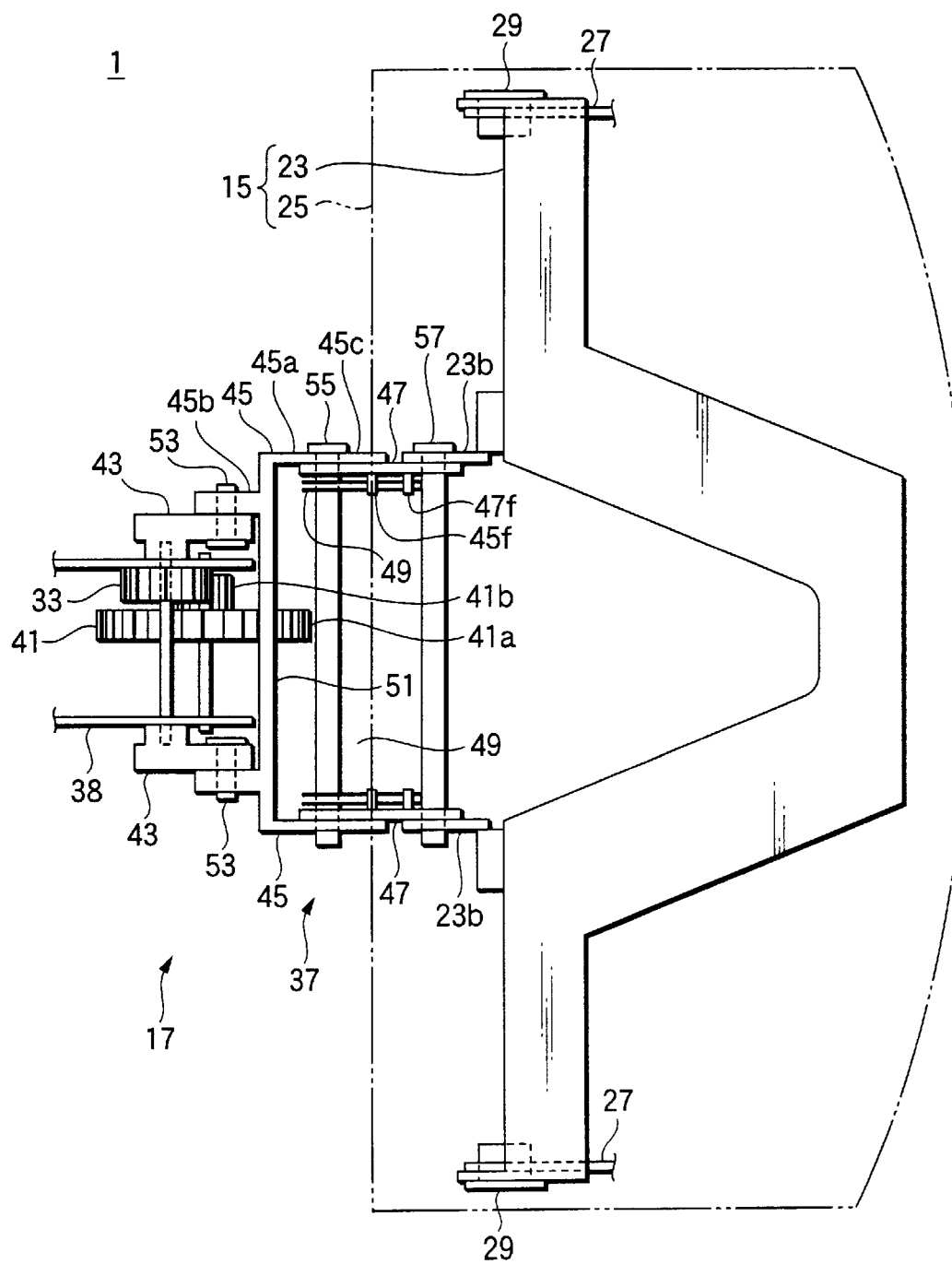
FIG. 2 is a plan view of FIG. 1.
Figure 3:
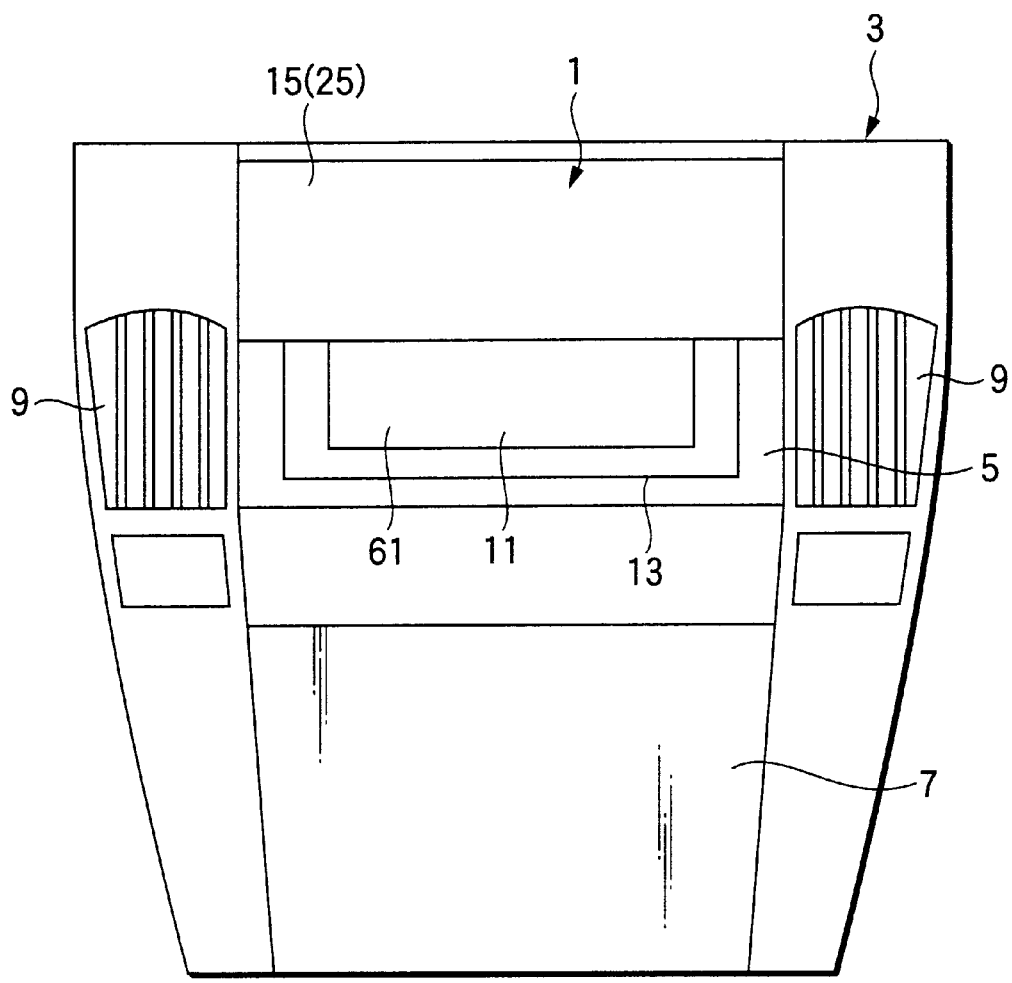
FIG. 3 is a front view of a center module in which the automotive display device shown in FIG. 1 is installed.

FIG. 1 is a partially cut away side view of a main portion of an automotive vehicle display device according to one embodiment of the invention, FIG. 2 is a plan view of FIG. 1, and FIG. 3 is a front view of a center module in which the automotive display device of FIG. 1 is installed.

As shown in FIG. 3, this display device 1 is incorporated into the center module 3 which is installed in a dashboard central portion of an automotive vehicle. Namely, the center module 3 in this embodiment corresponds to a dashboard portion of the invention. Provided in an upper portion of the center module 3 is an accommodating portion 5 in which the display device 1 is incorporated and accommodated. Note that reference numerals 7 and 9 in FIG. 3 denotes an equipment accommodating portion for accommodating therein on-board equipment such as a car audio component and central outlets for an air conditioner, respectively.

Figure 13:
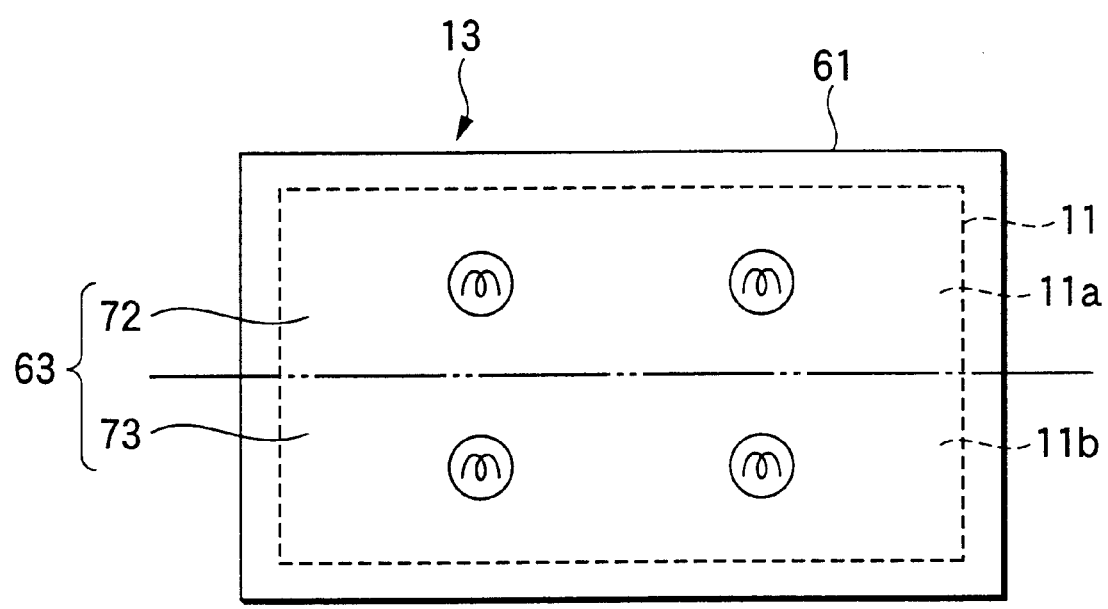
FIG. 13 is a typical view showing the construction of a display unit.

As shown in FIG. 1, the display device 1 comprises a display unit (display) 13 installed in the accommodating portion 5 with a screen 11 facing front seats, a movable closing member 15 for closing and/or opening an opening in the accommodating portion 5, a driving mechanism 17 for driving the closing member 15 to be closed and/or opened, a control portion (control means) 19 (refer to FIG. 13) for controlling the driving of said driving mechanism 17, and a central control portion 21 (refer to FIG. 13). Note that this central control portion 21 may be omitted.

As shown in FIGS. 1 and 2, the closing member 15 comprises a frame member 23 and a hood member 25. The frame member 23 is rotatably pin connected at distal end portions of left and right supporting arms 23a thereof to supporting members 27 provided on the center module 3 with pins 29, so that the frame member 23 is supported vertically rotatably around the pins 29 functioning as rotating shafts. The hood member 25 is substantially a plate-like member which is fixed to the frame member 23 and opens and/or closes the opening of the accommodating portion 5 as the frame member 23 rotates around the pins 29.

As shown in FIGS. 1 and 2, the driving mechanism 17 comprises a motor 31, a gear 33, a reduction gear mechanism 35 for transmitting the rotating power of the motor 31 to the gear 33, and a link mechanism 37 for driving the closing member 15 to be closed and/or opened based on the rotating power of the gear 33. The motor 31, the gear 33 and the gear mechanism 35 are supported by a supporting member 38 provided on the center module 3. Note that in FIG. 2, as a matter of convenience, a warm gear 39 for the motor 31 and the gear mechanism 38, which will be described later on, is omitted.

A pulse motor with a rotary encoder is used as the motor and outputs a pulse signal as said motor rotates.

The gear mechanism 35 comprises the warm gear 39 mounted on a rotating shaft of the motor and a transmission gear 41 for transmitting the rotation of the warm gear 39 to the gear 33. The transmission gear 41 comprises a large-diameter gear portion 41a and a small-diameter gear portion 41b such that the large-diameter gear portion 41a mesh engages with the warm gear 39, while the small-diameter gear portion 41b mesh engages with the gear 33.

The gear 33 is supported on the supporting member 38 in such a manner as to rotate around a transverse shaft and is designed to rotate around the transverse shaft when the rotating power of the motor 31 is given thereto via the gear mechanism 35.

Figure 4:
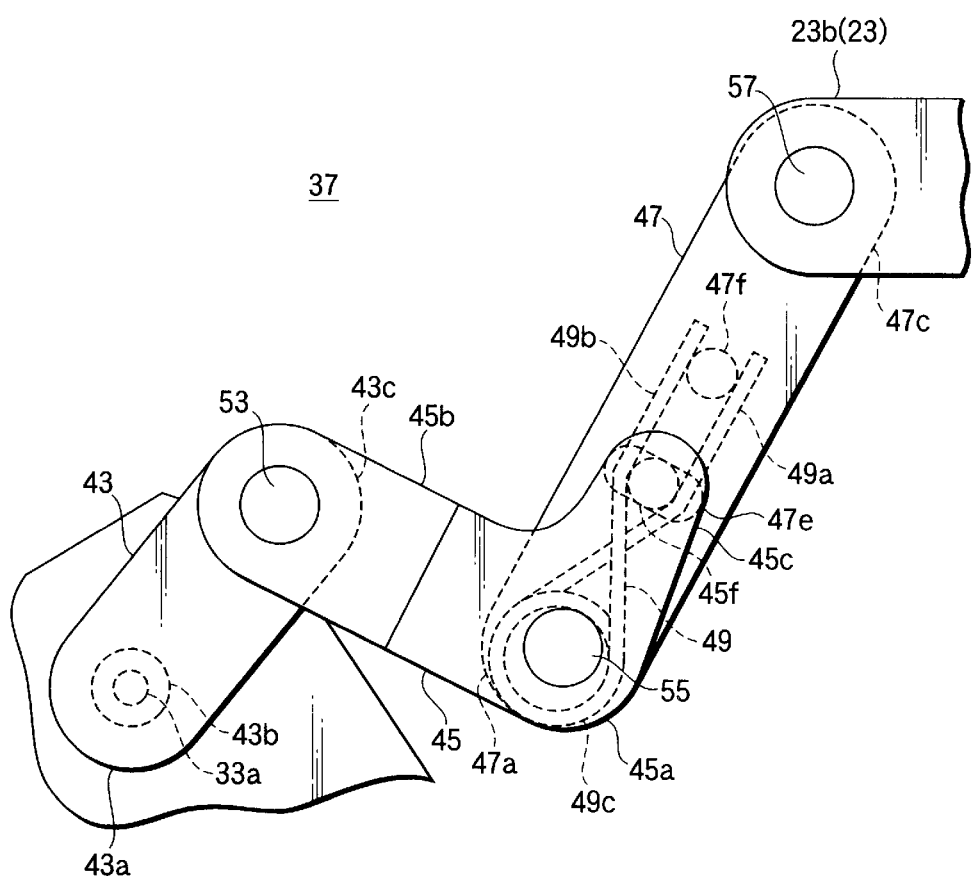
FIG. 4 is a partially enlarged view of FIG. 1.

As shown in FIG. 4, the link mechanism 37 comprises first to third pairs of link members 43, 45, 47 which are each provided on left and right and a pair of left and right spring members (biasing means) 49. Note that as to the second pair of link members 45, the left and right link members 45 are integrally connected by a connecting portion 51 (refer to FIG. 2).

Figure 5:
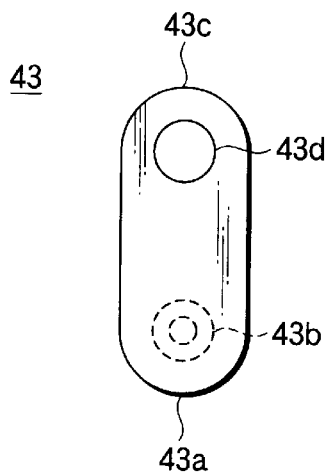
FIG. 5 is a diagram showing a first link member.

As shown in FIGS. 2, 4 and 5, the first link member 43 is formed substantially into a rod-like shape, and a mounting portion 43b to a shaft 33a of the gear 33 which rotates together with the gear 33 is provided on one end portion (distal end portion) 43a of the link member 43 and a hole 43d for connecting to the second link member 45 is formed in the other end portion (free end portion) 43c thereof. Then, when the mounting portion 43b is mounted on the shaft 33a, the link member 43 is designed to rotate together with the gear 33 around the transverse shaft.

Figure 6:
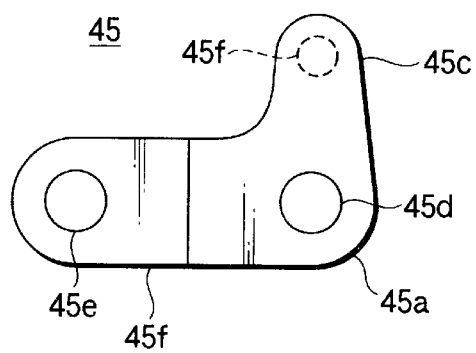
FIG. 6 is a diagram showing a second link member.

As shown in FIGS. 2, 4 and 6, the second link member 45 has first and second arm portions 45b, 45c extending from a bend portion 45a in two directions in such a manner as to form an L-shape as viewed from a side. A hole 45d is formed in the bend portion 45a for connecting to the third link member 47, a hole 45e for connecting to the first link member 43 is formed in a distal end portion of the first arm portion 45b, and an engagement projection (second engagement portion) 45f is provided at a distal end portion of the second arm portion 45c in such a manner as to project inwards along a direction of the rotating axis of the closing member 15.

Figure 7:
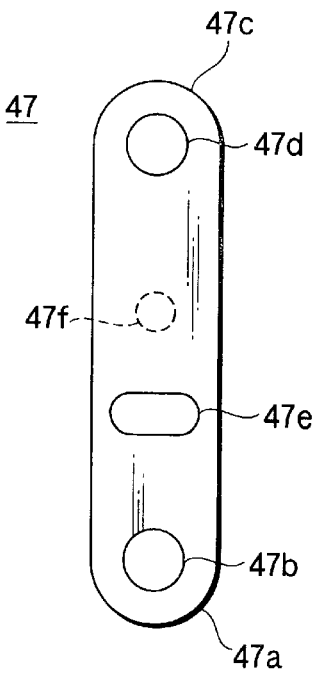
FIG. 7 is a diagram showing a third link member.

As shown in FIGS. 2, 4 and 7, the third link member 47 is formed substantially into a rod-like shape. A hole 47b is formed in one end portion 47a of the third link member 47 for connecting to the second link member 45 and a hole 47d for connecting to the frame member 23 of the closing member 15 is formed in the other end portion thereof. In addition, formed in and provided at an intermediate portion of the link member is, respectively, an elongate hole 47e having a slightly elongate shape in a direction normal to a longitudinal direction of the link member 47 and an engagement projection (third engagement portion ) 47f which projects inwards along a direction of the rotating axis of the closing member 15.

Here, the elongate hole 47e and the engagement projection 47f are, respectively, formed and provided on a straight line connecting the holes 47b, 47d formed in the end portions of the third link member 47. The elongate hole 47e is formed in a position where the engagement projection 45 of the second link member 45 is loosely inserted when the hole 47b in the end portion 47a is connected to the hole 45d in the second link member 45 with a pin 55. The engagement portion 47f is provided at a position where a distance from the hole 47d thereto becomes longer than a distance from the hole 47d to the elongate hole 47e.

The spring member 49 is a helical spring in which arm portions 49a, 49b at ends thereof projects like a rod from a wound portion 49c which is wound helically.

The connection of the first link members 43 with the second link members 45 is effected by inserting pins 53 into the holes 43d, 45e, whereby the two link members 43, 45 are connected with each other rotatably around the pins 53 acting as a transverse shaft. Note that in this embodiment the two link members are connected with each other such that the second link members 45 are positioned outwards of the first link members 43.

The connection of the second link members 45 with the third link members 47 is effected by inserting the pin 55 in the holes 45d, 47d, whereby the two link members 45, 47 are connected with each other rotatably around the pin 55 acting as a transverse shaft. In this connected state, the second link members 45 are positioned outwards of the third link members 47, and the engagement projections 45f of the second link members 45 project inwards of the third link members 47 via the elongate holes 47e in the third link members 47.

The connection of the third link members 47 with the frame member 23 of the closing member 15 is effected by inserting a pin 57 in holes, not shown, in left and right connecting portions 23b of the frame member 23 and the holes 47d in the link members 47, whereby the third link members 47 are connected to the connecting portions 23b rotatably around the pin 57 acting as a transverse shaft. Note that the connecting portion 23b is provided at a position which is located away from a position where the frame member 23 is rotatably supported by the pin 29 (the distal end portion of the supporting arm 23a).

Figure 8:
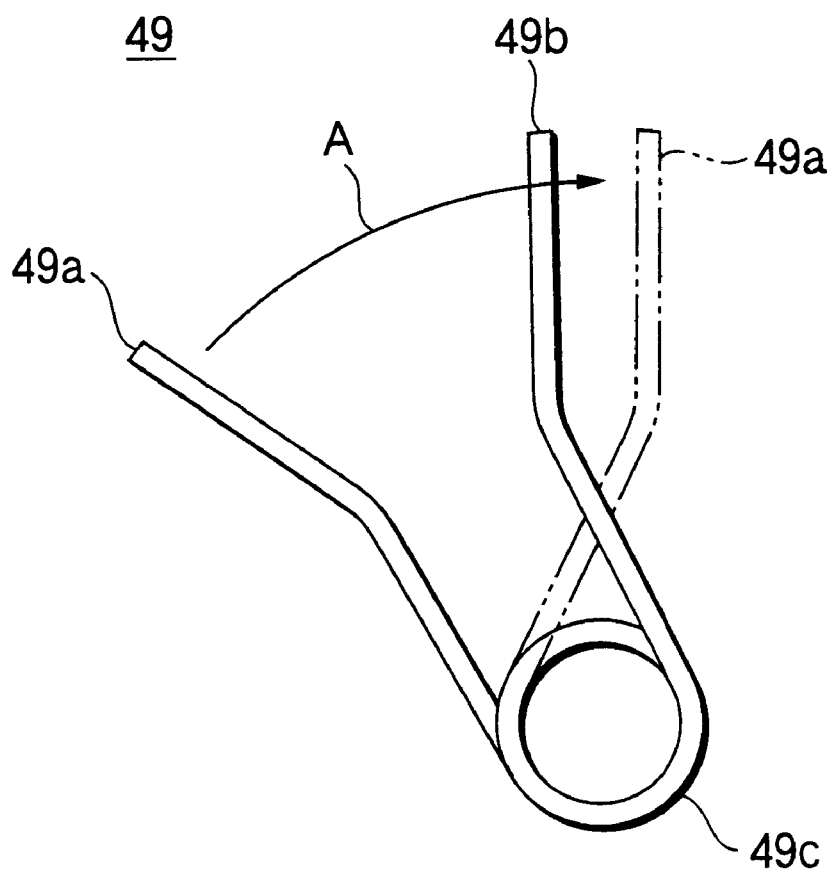
FIG. 8 is a diagram showing a spring member.

The mounting of the spring member 49 is performed as below. With the pin 55 being inserted in the wound portion 49c of the spring member 49, the two arm portions 49a, 49b which extend like a rod are crossed as shown by an arrow A in FIG. 8, so that the two arm portions 49a, 49b are brought into engagement with the two engagement projections 45f, 47f in such a manner as to hold the two engagement projections 45f, 47f between the two arm portions 49a, 49b, whereby the engagement projection 45f is biased by the two arm portions 49a, 49b of the spring member 49 so as to be positioned on a straight line connecting the pin 55 with the engagement projection 47f. Note that in this embodiment, the pin 55 corresponds to a first engagement portion according to the invention.

In this construction, when the motor 31 is driven to rotate, the rotating power of the motor 31 is transmitted to the gear 33 via the gear mechanism 35, and as the gear 33 rotates, the first link members 43 are driven to rotate within a predetermined rotating angle range. As this occurs, the rotating power of the link members 43 is then transmitted to the closing member 15 via the second and third link members 45, 47, and as the link members 43 rotationally move, the closing member 15 rotate around the pins 29, whereby the opening in the accommodating portion 5 is closed and/or opened.

Figure 9:
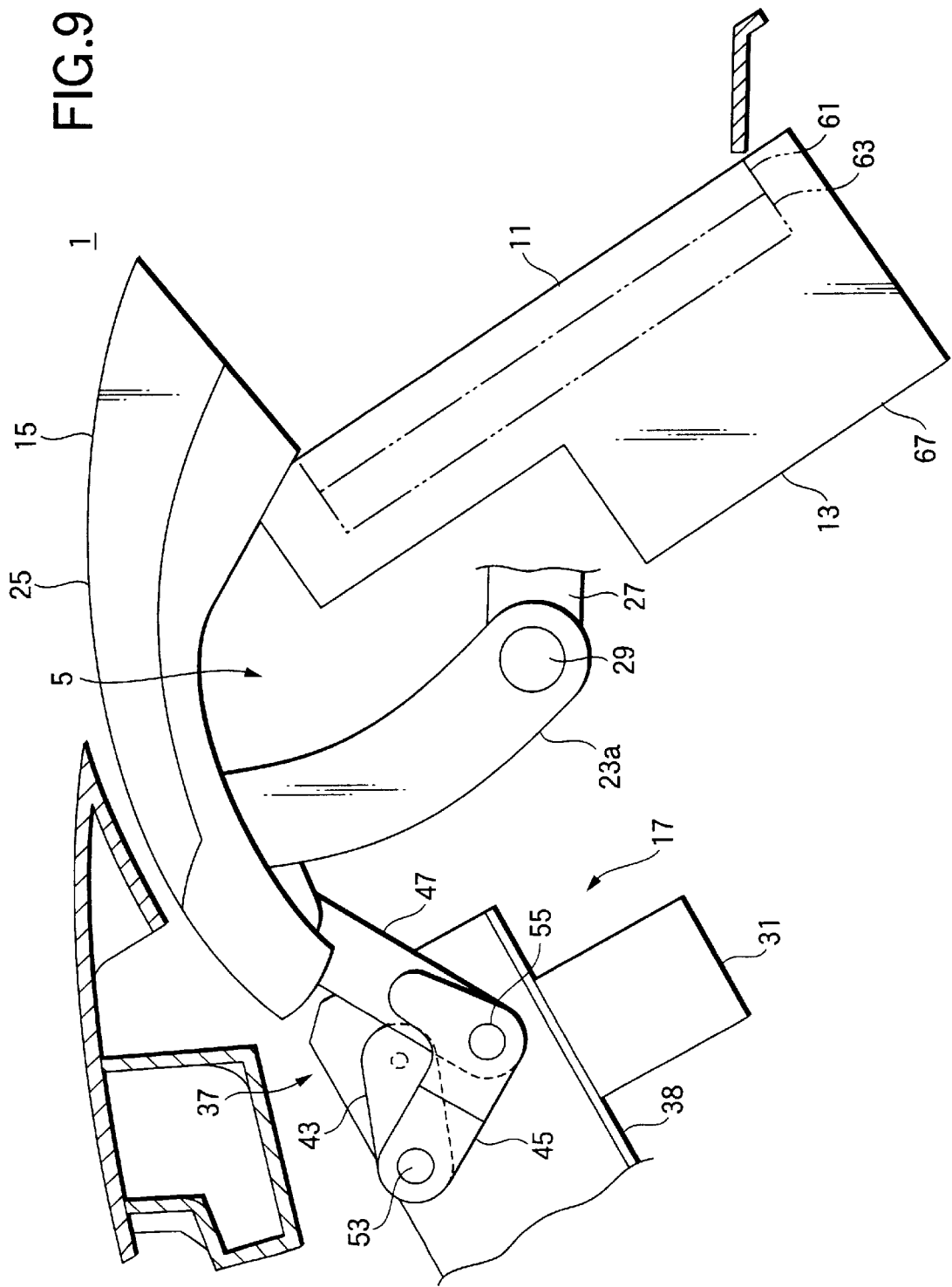
FIG. 9 is a diagram showing a state in which a closing member shown in FIG. 1 is fully opened.
Figure 10:
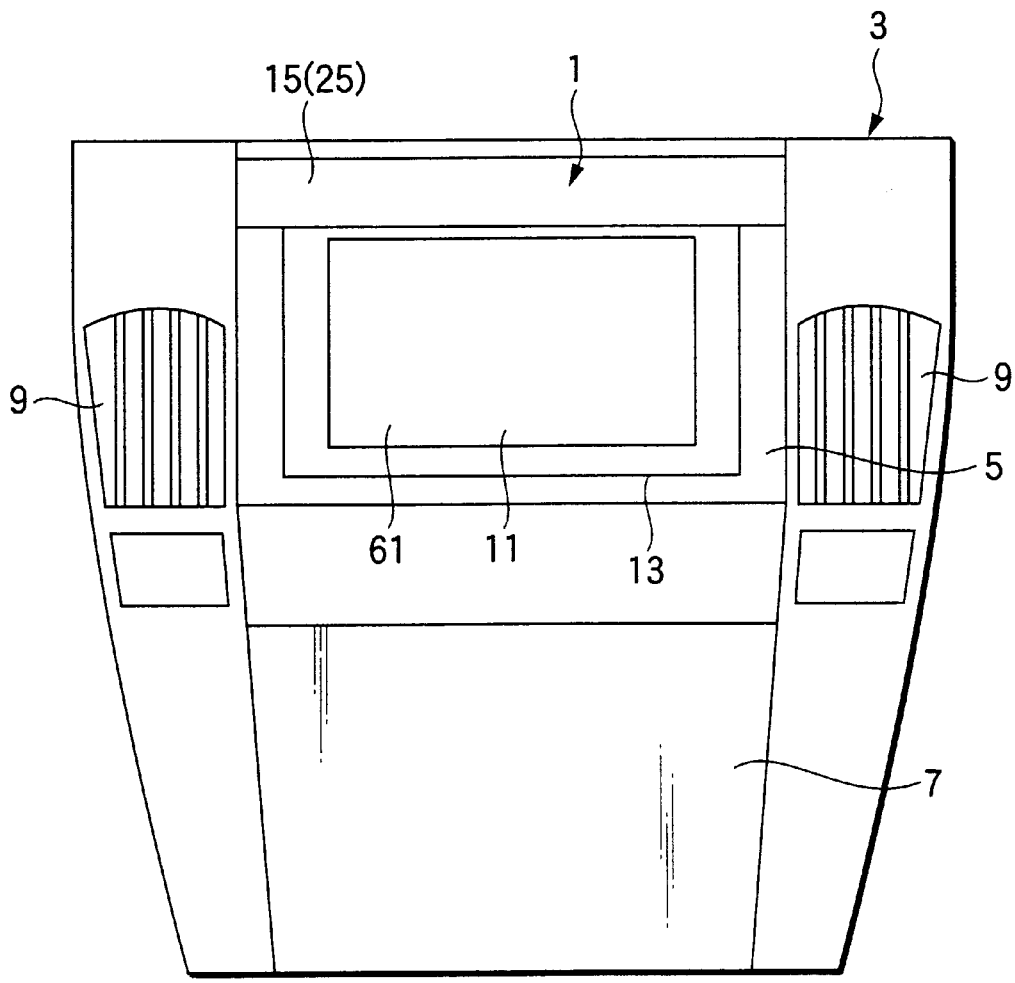
FIG. 10 is a diagram showing a state in which the closing member shown in FIG. 3 is fully opened.
Figure 11:
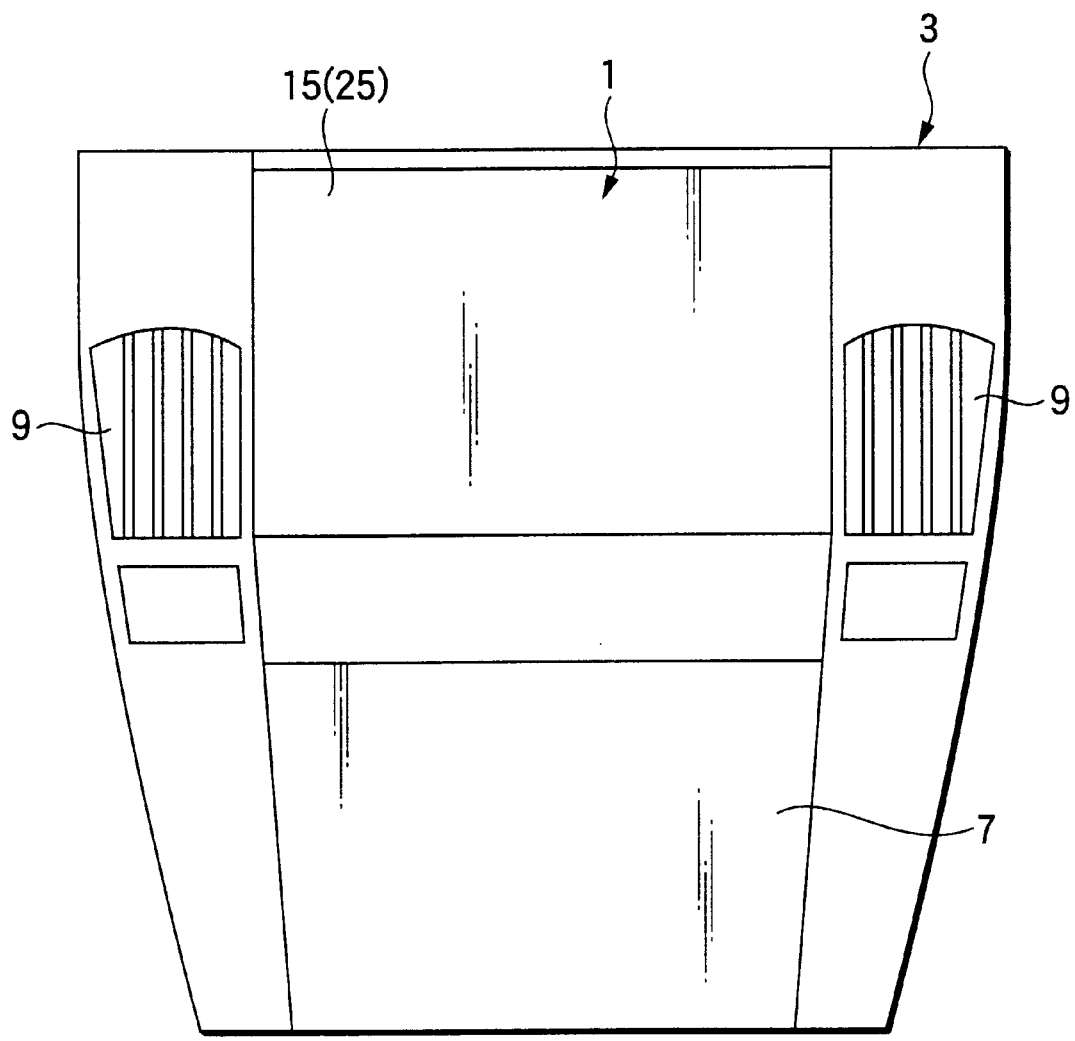
FIG. 11 is a diagram showing a state in which the closing member shown in FIG. 3 is fully closed.

Here, FIGS. 1, 2 and 3 show a state in which the closing member 15 is opened such that the opening width of the opening in the accommodating portion 5 becomes half a maximum opening width resulting when the closing member is fully opened, FIGS. 9 and 10 show a state in which the closing member is opened such that the opening in the accommodating portion 5 is fully opened, and FIG. 11 shows a state in which the opening in the accommodating portion 5 is fully closed with the closing member 15.

When the closing member 15 is opened and/or closed as described above, in a normal state in which an excessive load is not applied to the closing member 15, the power from the gear 33 is transmitted to the closing member 15 via the link mechanism 37 with the second arm portion 45c of the second link member 45 overlapping with the third link member 47 linearly (that is, in a state in which the pin 55 and the engagement projections 45f and 47f are aligned with one another linearly).

On the contrary, in the event that an excessive load is applied to the closing member 15 or the like when it is opened or closed, the second arm portion 45c of the second link member 45 and the third link member 47 rotate relative to each other such that the pin 55 and the engagement projections 45f and 47f are arranged in substantially a "V" shape against the biasing force of the springs 49, whereby the excessive torque is designed to be released.

In addition, when the closing member 15 reaches a fully closed position and a fully opened position, a predetermined abutment portion, not shown, on the closing member 15 is constructed to be brought into abutment with a predetermined abutment portion, not shown, on the center module 3, whereby the closing member 15 is prevented from rotating further in the closing and opening directions. Due to this, the looseness of the closing member 15 or the like resulting from a play can be prevented from occurring by constructing such that the closing member 15 is biased toward the closing and opening directions using the biasing force of the spring members 49 when the closing member 15 is fully closed and opened.

Figure 12:
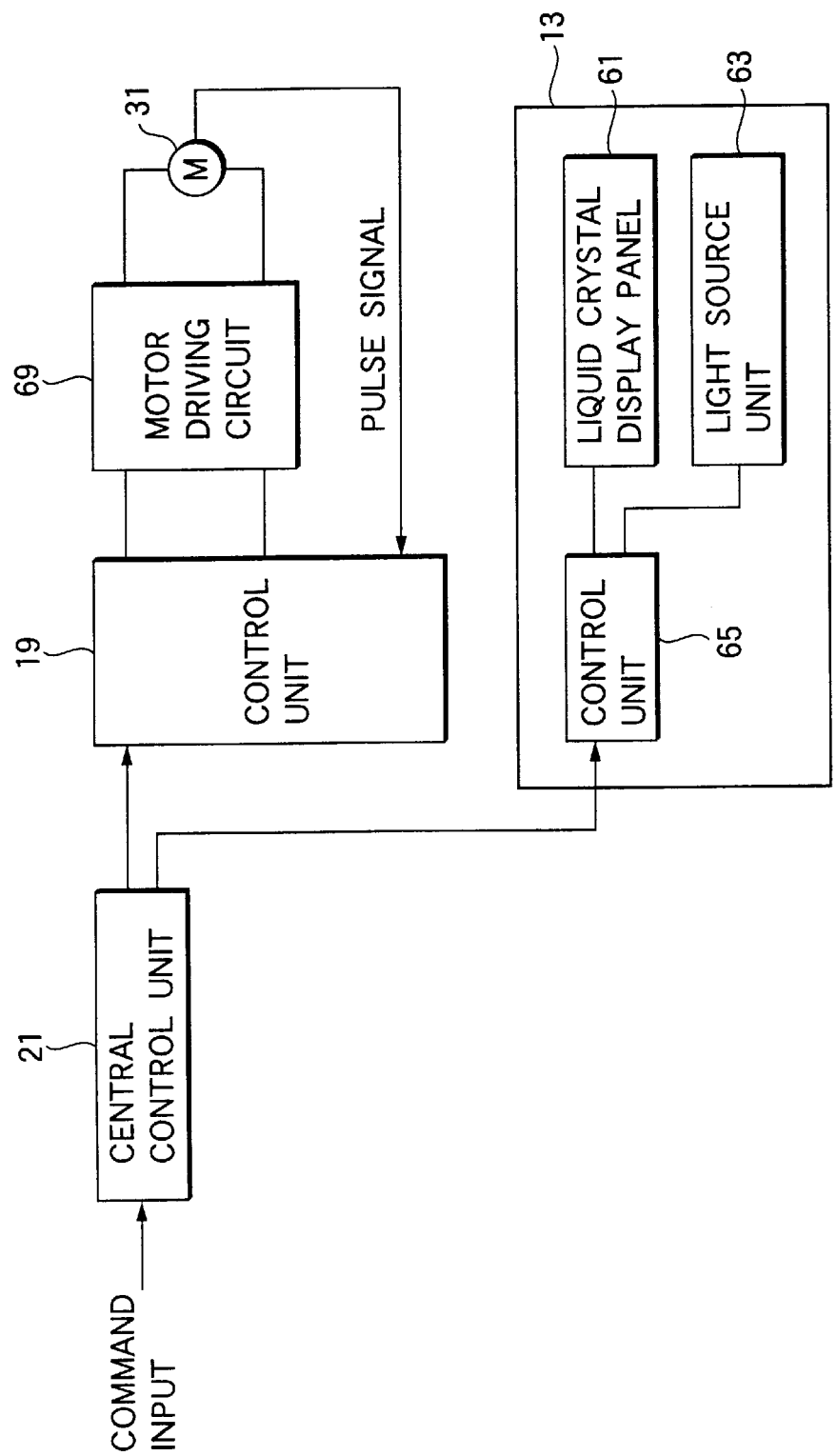
FIG. 12 is a block diagram of the automotive display device shown in FIG. 1.

FIG. 12 is a block diagram of the automotive display device according to the embodiment of the invention. Responding to an opening or closing command given by a central control unit 21, a control unit 19 detects a pulse output outputted from the motor 31 and controls the driving of the motor 31 via a motor driving circuit 69 to thereby open and/or close the closing member 15, whereby the opening width of the opening in the accommodating portion 5 is adjusted when the closing member 15 is opened. Note that while the control unit 19 is constructed to open and/or close the closing member 15 in response to an opening or closing command outputted by the central control unit 21 in response in turn to an operation input directing to open or close the closing member 15, the control unit 19 may be constructed to directly respond to an operation input so as to open or close the closing member 15 without providing the central control unit 21.

To be more specific, with the closing member 15 being closed, when the central control unit 21 receives an operation input which directs to open the closing member 15, the central control unit 21 outputs a command to open the closing member 15 to the control unit 19. As this occurs, an opening width of the opening in the accommodating portion 5 which corresponds to the operation input is also adjusted by the control unit 19.

Responding to the command from the central control unit 21, while counting pulses given by the motor 31, the control unit 19 drives the motor 31 via the motor driving circuit 69 until the number of pulses so counted reaches a value corresponding to a designated opening width, whereby the closing member 15 is driven to be opened from the fully closed position to an open position corresponding to the designated opening width. As this occurs, the number of pulses counted is retained by the control unit 19 until the closing member 15 returns to the fully closed position again and is reset when the control unit 19 detects the return of the closing member 15 to the fully closed position.

In addition, when the closing member 15 is fully opened, while counting pulses given by the motor 31, the control unit 19 drives the motor 31 via the motor driving circuit 69 until the closing member reaches the fully opened position. As this occurs, that the closing member 15 has reached the fully opened position is detected by detecting that the opening operation of the closing member 15 has been stopped at the fully opened position, that even if driving pulses for driving the motor 31 are outputted further, there is no pulse outputted from the motor and hence the revolution of the motor 31 is at a halt.

On the other hand, with the closing member 15 being opened at a predetermined open position, when the central control unit 21 receives an operation input directing to close the closing member 15, the central control portion 21 outputs to the control unit 19 a command to close the closing member 15.

Responding to the command from the central control unit 21, while counting pulses given by the motor 31, the control unit 19 drives the motor 31 via the motor driving circuit 69 until the closing member 15 reaches the fully closed position. As this occurs, that the closing member 15 has reached the fully closed position is detected by detecting that the closing operation of the closing member 15 has been stopped at the fully closed position, that even if driving pulses for driving the motor 31 are outputted further, there is no pulse outputted from the motor and hence the revolution of the motor 31 is at a halt.

In addition, when the closing member 15 is positioned at a position other than the fully closed position, the fully opened position or the designated open position, in the event that there is no pulse outputted from the motor 31 while being driven and hence the stop of revolution of the motor 31 is detected, the driving of the motor is stopped based on an understanding that something abnormal is happening in the driving mechanism 17 such as the failure of the driving mechanism 17 or the trapping of a foreign matter therein.

The display unit 13 comprises a rectangular liquid crystal display panel (for example, a dot-matrix display type liquid crystal display panel) 61, a light source unit 63 disposed on a back side of the liquid crystal display panel 61 and a control unit 65 for controlling the liquid crystal display panel 61 and the light source unit 63. These liquid crystal display panel 61, the light source unit 63 and the control unit 65 are accommodated in a casing 67. The screen 11 of the liquid crystal display panel 61 is divided vertically into a plurality of sub-areas (here, into two halves) at a position indicated by a chain double-dashed line in FIG. 13. Note that for the display unit 13 according to the embodiment a large-sized display unit is adopted which can display television images and car navigation images.

To deal with the construction of the display unit described above, the light source unit 63 comprises two sets of backlights 72, 73 for illuminating an upper portion area 11a and a lower portion area 11b of the screen 11, respectively. The respective sets of backlights 72, 73 are controlled by the control unit 65 such that the backlights 72, 73 are turned on and/or off independently of each other. While the backlights are constituted by fluorescent lamps, incandescent lamps or LED, a surface luminescent EL device may be used for illuminating respective sub-areas 11a, 11b in a planar fashion to thereby reduce scattering in quantity of light.

In addition, to deal with the above construction, according to the embodiment of the invention, the opening width of the accommodating portion 5 is constructed to change in a stepped fashion in accordance with the number of sub-areas resulting by the division of the screen 11 of the display unit 13. That is, in the embodiment, the closing member 15 is constructed to be closed in a stepped fashion (in two steps) between the fully closed position shown in FIG. 11, an intermediately opened position as shown in FIGS. 2 and 3 in which only the lower sub-area 11b of the screen 11 of the display unit 13 is exposed to the outside, and the fully opened position in which the whole of the screen 11 is exposed to the outside.

When outputting an opening command to the control unit 19, the central control unit 21 outputs to the display unit 13 a command designating a display area on the screen which corresponds to the opening width of the opening. Responding to the command, the control unit 65 turns on the backlights 72, 73 of the light source unit 63 corresponding to the designated display area, whereby an image is displayed using the sub-areas 11a, 11b of the screen 11 of the liquid crystal display panel 61.

Here, in a case where a car navigation image is displayed, the whole of the screen 11 of the display unit 13 is exposed to the outside from the opening in the accommodating 5, the whole of the screen 11 of the display unit 13 is used for displaying a required image. In addition, in a case where only simple information is displayed such as information on the operation of on-board equipment or information constituted by simple and easy characters or symbols, a narrow display area is sufficient for the purpose, only the lower sub-area 11b may be exposed to the outside from the opening in the accommodating portion so that only the lower sub-area 11b is used for the display.

Figure 14:
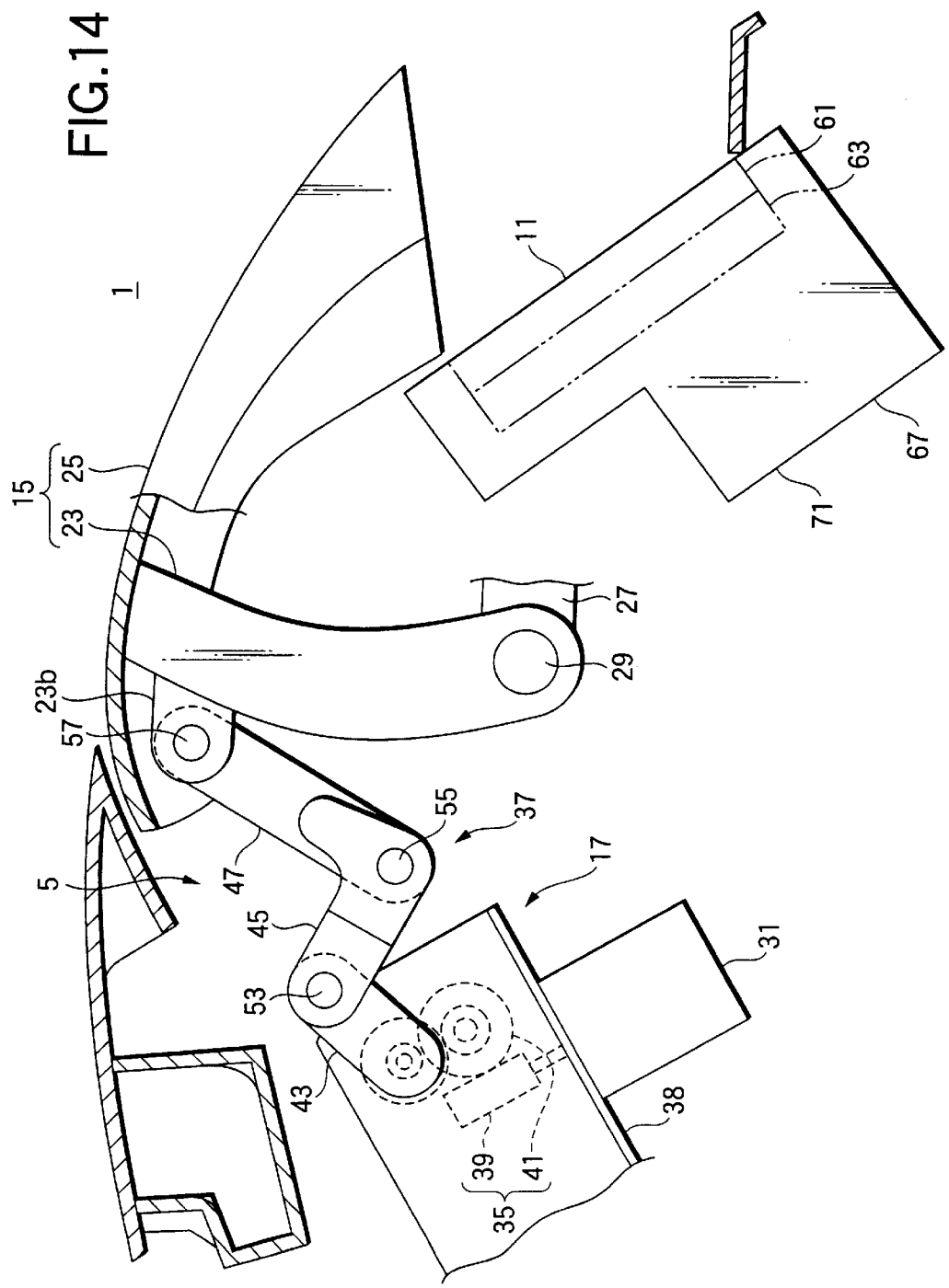
FIG. 14 is a diagram showing a state in which a small-sized display unit is installed in the display unit shown in FIG. 1.

Additionally, in the embodiment, while the large-sized display unit is used for the display unit 13 which can display the car navigation information, as shown in FIG. 14, in a case where a small-sized display unit 71 is used to display information on the operation on the on-board equipment or information constituted by simple and easy characters and symbols, the opening width when the closing member 15 is opened can be adjusted to the size of the screen 11 of the display unit 71.

As has been described heretofore, according to the embodiment of the invention, since the display unit 13 is installed in the accommodating portion 15 provided in the center module 3 and the display unit 13 is designed to emerge or submerge by opening or closing the opening in the accommodating portion with the closing member 15, the display unit 13 therefore being not constructed so as be movable as in the case with the conventional display unit, even if there are provided touch switches on the display unit 13, the supporting construction of the display unit 13 can be prevented from being affected by a load that would be generated when operating the touch switches.

Additionally, since the conventional construction is not adopted in which the display unit 13 is pulled downwards so as to be accommodated into the dashboard portion (the center module 3), the display device 1 according to the embodiment of the invention can be installed even on an automotive vehicle which has less space in the interior of the dashboard portion.

Furthermore, since the opening width of the opening can be adjusted to the size of the display unit, there is no need to replace supporting units for display units every time a display unit of a different size is used, thereby making it possible to reduce the number of components used.

In addition, since the opening width of the opening in the accommodating portion 5 is adjusted to the vertical width of a display area on the screen 11 of the display unit 13 which is actually used for required display, in a case where a simple display of information such as one on the operation of on-board equipment is sufficiently implemented on the narrow display area, the required display can be effected by allowing only a portion on the screen 11 of the display unit 13 which is sufficient for the display can be exposed to the driver or the like to thereby reduce the burden visually applied to the driver or the like.

Furthermore, since the motor with an encoder is used for the motor 31 for the driving mechanism 17, the opening width of the opening in the accommodating portion 5 can be set accurately to any size based on an pulse output outputted from the motor 31.

Additionally, since the opening width of the opening can be adjusted to the vertical width of the display area of the display unit 13 where a display actually takes place in the state in which the opening in the accommodating portion 5 is opened, the opening width of the accommodating portion 5 can automatically be set to an appropriate size according to the vertical width of the display area of the display unit 13.

Furthermore, only the backlights 72, 73 corresponding to the portions of the screen 11 of the display unit 13 which are exposed to the outside to implement required display are automatically turned on, while the backlights 72, 73 corresponding to the portions on the screen 11 which are not required for the display are constructed so as to be automatically turned off, thereby making it possible to save the consumption of electric power.

Additionally, as has been described above, in the event that excessive torque is applied to the first to third embodiments when the closing member 15 is opened and/or closed by virtue of the operation of the link mechanism 37 having the spring members 29, the excessive torque can be released, and when the closing member 15 is located at the fully opened position or the fully closed position, the looseness of the closing member 15 can be prevented from by making use of the biasing force of the spring members 49.

<Modified Example>

Figure 15:
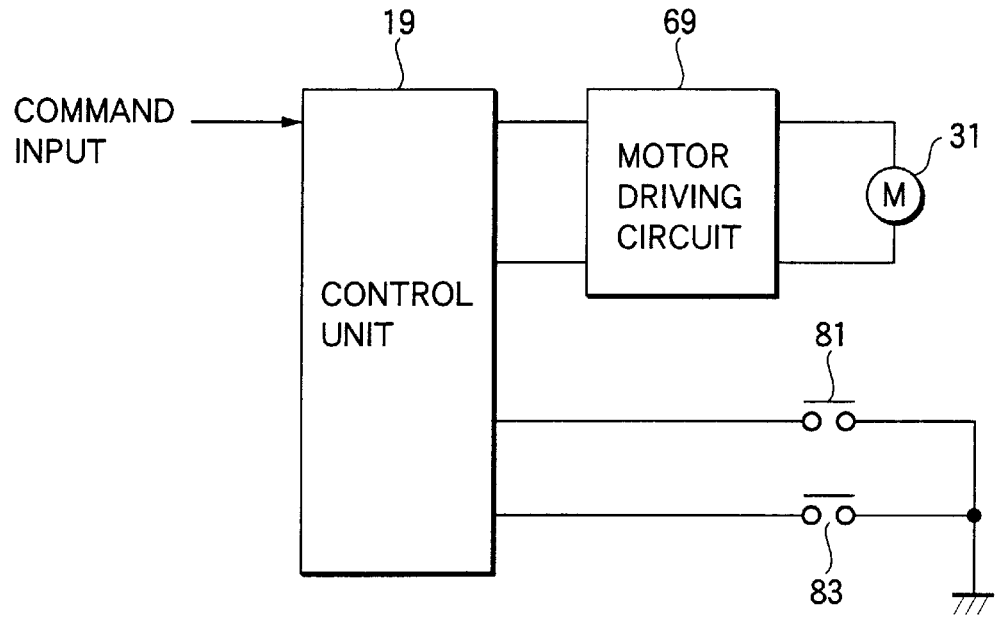
FIG. 15 is a block diagram of a first modified example of the display device shown in FIG. 1.
Figure 16:
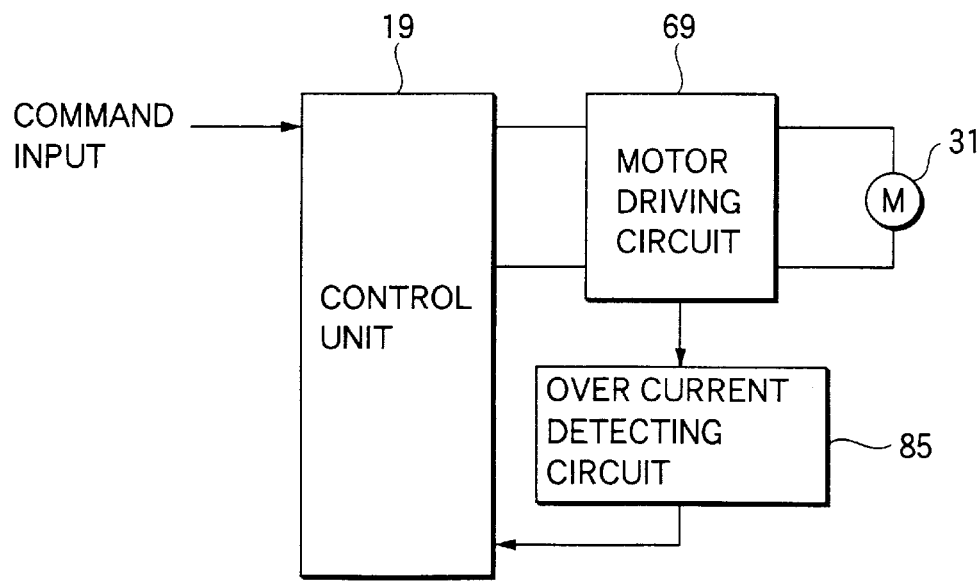
FIG. 16 is a block diagram of a second modified example of the display device shown in FIG. 1.

FIG. 15 is a block diagram of a first modified example of the display device 1 according to the embodiment of the invention. In this modified example, there are provided limit switches 81, 83 for detecting closed and/or opened angular positions of the closing member 15 (here, for detecting a fully closed position and a fully opened position). Then, while detecting the rotating angular position (here, for detecting a fully closed position and a fully opened position) of the closing member 15 based on detection outputs from the limit switches 81, 83, the control unit 19 adjusts the opened position of the closing member 15 (here, the closing member 15 is designed to alternatively be opened and/or closed between the fully opened position and the fully closed position). Due to this, there is no need to provide the motor 31 with an encoder in this modified example.

While the light source unit 63 in which the backlights 72, 73 can be selectively turned on and off is provided on the back of the display unit 13 in the aforesaid embodiment, in another modified example, in a case where a liquid crystal display panel 61 used is of a dot-matrix type such as using a TFT system, a light source unit may be provided on the display unit 13 which is adapted to be illuminated at all times on the whole surface thereof to illuminate the whole surface of a screen 11 when the light source unit is turned on for implementing display. In this case, when display is implemented, an area on the screen 11 which is covered with the closing member 15 and in which no display is implemented is displayed black.

In addition, while the liquid crystal display unit is used for the display unit 13 in the aforesaid embodiment, an EL display unit (for example, an organic EL display unit) may be used as the display unit 13.

According to the first to sixth aspect of the invention, since the display unit is installed in the accommodating portion provided in the dashboard portion and the display unit is constructed to emerge or submerge by opening or closing the opening of the accommodating portion with the closing member, the display unit being not constructed so as to be movable as in the case with the conventional display unit, even if touch switches are provided on the display unit, it is possible to prevent the supporting construction of the display unit from being affected by a load that would be generated when the touch switches are operated.

Additionally, since the conventional construction is not adopted in which the display unit is pulled downwards so as to be accommodated into the dashboard portion, the display device according to the embodiment of the invention can be installed even on an automotive vehicle which has less space in the interior of the dashboard portion.

According to the second aspect of the invention, since the opening width of the opening can be adjusted to the size of the display unit, there is no need to replace supporting units for display units every time a display unit of a different size is used, thereby making it possible to reduce the number of components used.

In addition, since the opening width of the opening in the accommodating portion is adjusted to the vertical width of a display area on the screen of the display unit which is actually used for required display, in a case where a large-sized display unit is used which can display a car navigation screen, when a simple display of information such as one on the operation of on-board equipment is sufficiently implemented on the narrow display area, the required display can be effected by allowing only a portion on the screen of the display unit which is sufficient for the display can be exposed to the driver or the like to thereby reduce the burden visually applied to the driver or the like.

According to the third aspect of the invention, since the motor an encoder is used for the motor for the driving mechanism, the opening width of the opening in the accommodating portion can be set accurately to any size based on an pulse output outputted from the motor.

According to the fourth aspect of the invention, since the opening width of the opening can be adjusted to the vertical width of the display area of the display unit where a display actually takes place in the state in which the opening in the accommodating portion is opened, the opening width of the accommodating portion can automatically be set to an appropriate size according to the vertical width of the display area.

According to the fifth aspect of the invention, only the backlights corresponding to the portions of the screen of the display unit which are exposed to the outside to implement required display are turned on, while the backlights corresponding to the portions on the screen which are not required for the display are constructed so as to be turned off, thereby making it possible to save the consumption of electric power.

According to the sixth aspect of the invention, since the first link members are connected to the closing member via the second link members and the third link members while the first to third three engagement projections provided on the second link members and the third link members are biased with the biasing means so that the three engagement projections are aligned with one another linearly, in the event that the excessive torque is applied to the first to third link members or the like when the closing member is opened and/or closed, the second arm portions of the second link members and the third link members rotate relative to each other against the biasing force of the biasing means such that the link members are arranged in substantially the "V" shape, whereby the excessive torque can be released. Moreover, when the closing member is located at the fully closed position or the fully opened position, the looseness of the closing member can be prevented by making use of the biasing force of the biasing means.

What is claimed is:

1. An automotive display device installed in a dashboard portion of an automotive vehicle, comprising:

a display unit installed in an accommodating portion provided in said dashboard portion; and a closing member provided on said dashboard portion for closing and/or opening an opening in said accommodating portion, the closing member opening and/or closing in a stepped fashion between more positions than a fully closed position and a fully opened position.

2. The automotive display device as set forth in claim 1, wherein said closing member is supported on said dashboard portion rotatably around a transverse shaft so as to close and/or open said opening in vertical directions; and wherein said automotive display device further comprises: a driving mechanism for driving said closing member to rotate based on the power of a motor to thereby open and/or close said closing member; and a controller for controlling the driving of said driving mechanism in response to an external input to thereby close and/or open said closing member and adjusting an opening width of said opening in a state in which said opening is left open.

3. An automotive display device installed in a dashboard portion of an automotive vehicle, comprising:

a display unit installed in an accommodating portion provided in said dashboard portion; and a closing member provided on said dashboard portion for closing and/or opening an opening in said accommodating portion, said closing member being supported on said dashboard portion rotatably around a transverse shaft so as to close and/or open said opening in vertical directions;

wherein said automotive display device further comprises: a driving mechanism for driving said closing member to rotate based on the power of a motor to thereby open and/or close said closing member; and a controller for controlling the driving of said driving mechanism in response to an external input to thereby close and/or open said closing member and adjusting an opening width of said opening in a state in which said opening is left open;

wherein said motor of said driving mechanism is a servo motor with an encoder; and wherein said controller adjusts the opening width of said opening to a predetermined value based on a pulse output outputted from said motor as said motor revolves.

4. An automotive display device installed in a dashboard portion of an automotive vehicle, comprising:

a display unit installed in an accommodating portion provided in said dashboard portion; and a closing member provided on said dashboard portion for closing and/or opening an opening in said accommodating portion, said closing member being supported on said dashboard portion rotatably around a transverse shaft so as to close and/or open said opening in vertical directions;

wherein said automotive display device further comprises: a driving mechanism for driving said closing member to rotate based on the power of a motor to thereby open and/or close said closing member; and a controller for controlling the driving of said driving mechanism in response to an external input to thereby close and/or open said closing member and adjusting an opening width of said opening in a state in which said opening is left open;

wherein said display unit has a function to vary a display area on a screen where display actually takes place; and wherein said controller adjusts the opening width of said opening to a vertical width of said display area of said screen of said display unit in the state in which said opening is left open.

5. An automotive display device installed in a dashboard portion of an automotive vehicle, comprising:

a display unit installed in an accommodating portion provided in said dashboard portion; and a closing member provided on said dashboard portion for closing and/or opening an opening in said accommodating portion, said closing member being supported on said dashboard portion rotatably around a transverse shaft so as to close and/or open said opening in vertical directions;

wherein said automotive display device further comprises: a driving mechanism for driving said closing member to rotate based on the power of a motor to thereby open and/or close said closing member; and a controller for controlling the driving of said driving mechanism in response to an external input to thereby close and/or open said closing member and adjusting an opening width of said opening in a state in which said opening is left open;

wherein said display unit comprises: a liquid crystal display panel; and a light source unit having a plurality of backlights adapted to be switched on and/or off independently of each other and provided at positions on a back of said liquid crystal display panel which correspond, respectively, to a plurality of sub-areas obtained by vertically dividing said screen of said liquid crystal display panel into a plurality of areas; and wherein said controller adjust the opening width of said opening in such a manner as to expose to the outside said respective sub-areas of said screen of said display unit in a stepped fashion in the state in which said opening is left open.

6. An automotive display device installed in a dashboard portion of an automotive vehicle, comprising:

a display unit installed in an accommodating portion provided in said dashboard portion; and a closing member provided on said dashboard portion for closing and/or opening an opening in said accommodating portion, said closing member being supported on said dashboard portion rotatably around a transverse shaft so as to close and/or open said opening in vertical directions;

wherein said automotive display device further comprises: a driving mechanism for driving said closing member to rotate based on the power of a motor to thereby open and/or close said closing member; and a controller for controlling the driving of said driving mechanism in response to an external input to thereby close and/or open said closing member and adjusting an opening width of said opening in a state in which said opening is left open;

wherein said driving mechanism comprises:

a gear provided rotatably around a predetermined stationary transverse shaft located at a position of said closing member which is away from the rotating shaft of said closing member;

said motor for driving said gear to rotate via a gear mechanism;

a first link member adapted to rotate around said stationary transverse shaft together with said gear;

a second link member having first and second arm portions extending from a bend portion in two directions so as to form an L-shape when viewed from a side and pivotally connected at a distal end portion of said first arm portion thereof to a free end of said first link member;

a third link member pivotally connected at one end thereof to said bend portion of said second link member and at the other end to said position of said closing member which is away from the rotating shaft of said closing member;

a first engagement portion provided at either said bend portion of said second link member or said one end of said third link member;

a second engagement portion provided at a distal end portion of said second arm portion of said second link member;

a third engagement portion provided at either said one end or said the other end of said third link member such that a distance from said first engagement portion thereto becomes longer than a distance between said first and second engagement portions; and a biasing member adapted to be brought into engagement with said first, second and third engagement portions so as to bias said first, second and third engagement portions such that said first, second and third engagement portions are arranged linearly; and wherein the power of said motor is transmitted to said closing member via said gear mechanism, said gear, said first link member, said second link member and said third link member, whereby said closing member is closed and/or opened.

* * * * *